US011857472B2

(12) United States Patent
Iwase et al.

(10) Patent No.: US 11,857,472 B2
(45) Date of Patent: Jan. 2, 2024

(54) WHEELCHAIR

(71) Applicant: Mazda Motor Corporation, Hiroshima (JP)

(72) Inventors: Takashi Iwase, Aki-gun (JP); Isao Toda, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 555 days.

(21) Appl. No.: 17/174,355

(22) Filed: Feb. 12, 2021

(65) Prior Publication Data

US 2021/0282992 A1 Sep. 16, 2021

(30) Foreign Application Priority Data

Mar. 13, 2020 (JP) ................................. 2020-043665

(51) Int. Cl.

*A61G 5/10* (2006.01)
*A61G 3/02* (2006.01)
*A61G 3/08* (2006.01)

(52) U.S. Cl.

CPC ............. *A61G 5/1067* (2013.01); *A61G 3/02* (2013.01); *A61G 3/0808* (2013.01)

(58) Field of Classification Search

CPC ....... A61G 5/1067; A61G 3/02; A61G 3/0808
See application file for complete search history.

(56) References Cited

U.S. PATENT DOCUMENTS 6,416,272 B1 * 7/2002 Suehiro .................. A61G 3/062
280/643
9,016,797 B2 * 4/2015 Iida ........................ B60N 2/245
297/344.24
9,039,028 B2 * 5/2015 Kobayashi ............. A61G 5/006
280/304.1
9,463,121 B1 * 10/2016 Maeshiro ................. B60N 2/06

FOREIGN PATENT DOCUMENTS

JP 7-31456 A 2/1995

* cited by examiner

*Primary Examiner* — Kevin Hurley
*Assistant Examiner* — Michael R Stabley
(74) *Attorney, Agent, or Firm* — XSENSUS LLP

(57) ABSTRACT

A wheelchair includes a seating portion on which a wheelchair user sits, a body frame that supports the seating portion, a pair of rear wheels and a pair of front wheels rotatably supported by the body frame, and a seat back portion capable of changing the inclination angle with respect to the seating portion. The wheelchair includes push-along handle portions as engaging portions capable of fixing the seat back portion to a side sill as a vehicle body member that forms a door opening of the vehicle when the seat back portion is tilted backward of the wheelchair.

18 Claims, 9 Drawing Sheets

WHEELCHAIR

CROSS-REFERENCE TO RELATED APPLICATION

The present application contains subject matter related to Japanese Priority Application 2020-043665, filed in the Japanese Patent Office on Mar. 13, 2020, the entire contents of which being incorporated herein by reference in its entirety.

BACKGROUND

Field

The present disclosure relates to a wheelchair.

Description of the Related Art

Wheelchairs are used by elderly people, disabled people (physically handicapped people), and the like. Such wheelchair users may get on and off vehicles such as automobiles. At this time, such a wheelchair user may get on and off a vehicle with the assistance of a caregiver or may get on and off a vehicle by himself or herself.

Patent document 1 discloses an example of the structure for assisting a wheelchair user in getting on and off vehicles. Patent document 1 discloses a getting-on-and-off assist mechanism including an arm rotatably supported by a seat back constituting the backrest portion of a vehicle seat and a transfer board attached to the end of the arm.

The arm is rotatably supported by the frame of the seat back close to the door and the straight portion of the end portion can rotate between the posture along the side surface of the seat back and the posture along the side surface of the seat portion. The transfer board is rotatable with respect to the end portion of the arm and is substantially parallel to the seat portion when the transfer board is open, and the other end thereof projects outward of the door. A hook for locking the frame of the wheelchair is provided at the end of the transfer board.

In the getting-on-and-off assist mechanism disclosed in patent document 1, when getting on and off the vehicle, the wheelchair user opens the transfer board and locks the hook to the frame of the wheelchair so that the wheelchair user can move between the seat of the wheelchair and the seat of the vehicle via the transfer board.

PRIOR ART DOCUMENTS

Patent Documents

[Patent document 1] JP-UM-A-07-31456

SUMMARY

However, since the getting-on-and-off assist mechanism disclosed in patent document 1 above locks the wheelchair to the seat of the vehicle via the arm and the transfer board, which are separate members from the seat of the vehicle and the wheelchair, the wheelchair may become unstable when the wheelchair user gets on and off the vehicle.

The present disclosure addresses the above problems with an object of providing a wheelchair that can be stably fixed to a vehicle when the wheelchair user gets on and off the vehicle.

Means for Solving the Problems

A wheelchair according to an aspect of the present disclosure includes a seating portion on which a wheelchair user sits; a body frame that supports the seating portion; a wheel rotatably supported by the body frame; a seat back portion configured to change an inclination angle with respect to the seating portion; and an engaging portion configured to fix the seat back portion to a vehicle body member that forms a door opening of a vehicle by being engaged with the vehicle body member when the seat back portion is tilted backward of the wheelchair.

According to this structure, when the seat back portion is tilted backward of the wheelchair, the engaging portion is engaged with the vehicle body member forming the door opening of the vehicle, thereby enabling the seat back portion to be fixed to the vehicle body member. Accordingly, since the wheelchair and the vehicle are directly connected to each other without intervention of another member, the wheelchair can be stably fixed to the vehicle when the wheelchair user gets on and off the vehicle.

In the wheelchair described above, preferably, the engaging portion includes a push-along handle portion that is provided behind the seat back portion and grippable by an assistant pushing the wheelchair.

According to this structure, the engaging portion includes the push-along handle portion provided behind the seat back portion. Accordingly, the seat back portion can be easily fixed to the vehicle body member that forms the door opening of the vehicle by simply connecting the push-along handle portion to the vehicle body member when the seat back portion is tilted backward of the wheelchair. Moreover, since the push-along handle portion is also used as the engaging portion, an increase in the number of components of the wheelchair can be suppressed.

In the wheelchair described above, preferably, the push-along handle portion projects backward of the seat back portion and is engageable with an engaged portion formed in the vehicle body member when the seat back portion is tilted backward of the wheelchair.

According to this structure, when the seat back portion is tilted backward of the wheelchair, the push-along handle portion is engaged with the engaged portion such as a concave portion formed in the vehicle body member of the vehicle, thereby enabling the wheelchair to be stably fixed to the vehicle. Accordingly, the wheelchair user can easily transfer from the wheelchair to the seat of the vehicle. Moreover, after transferring to the seat of the vehicle, the state in which the wheelchair is fixed to the vehicle can be easily released by removing the push-along handle portion from the engaged portion of the vehicle body member.

In the wheelchair described above, preferably, the engaging portion has a holding portion disposed apart from the push-along handle portion, the holding portion being capable of holding the vehicle body member together with the push-along handle portion.

According to this structure, the push-along handle portion can be engaged with the engaged portion of the vehicle body member that forms the door opening when the seat back portion is tilted backward of the wheelchair, and the vehicle body member can be held by the pushed-along handle portion and the holding portion. This can securely fix the wheelchair to the vehicle body member.

An exemplary embodiment of the present disclosure will be described below with reference to the drawings. The embodiment described below is an example of the present disclosure and the present disclosure is not limited to the following embodiment except for the essential structure thereof.

DETAILED DESCRIPTION

Figure 1:
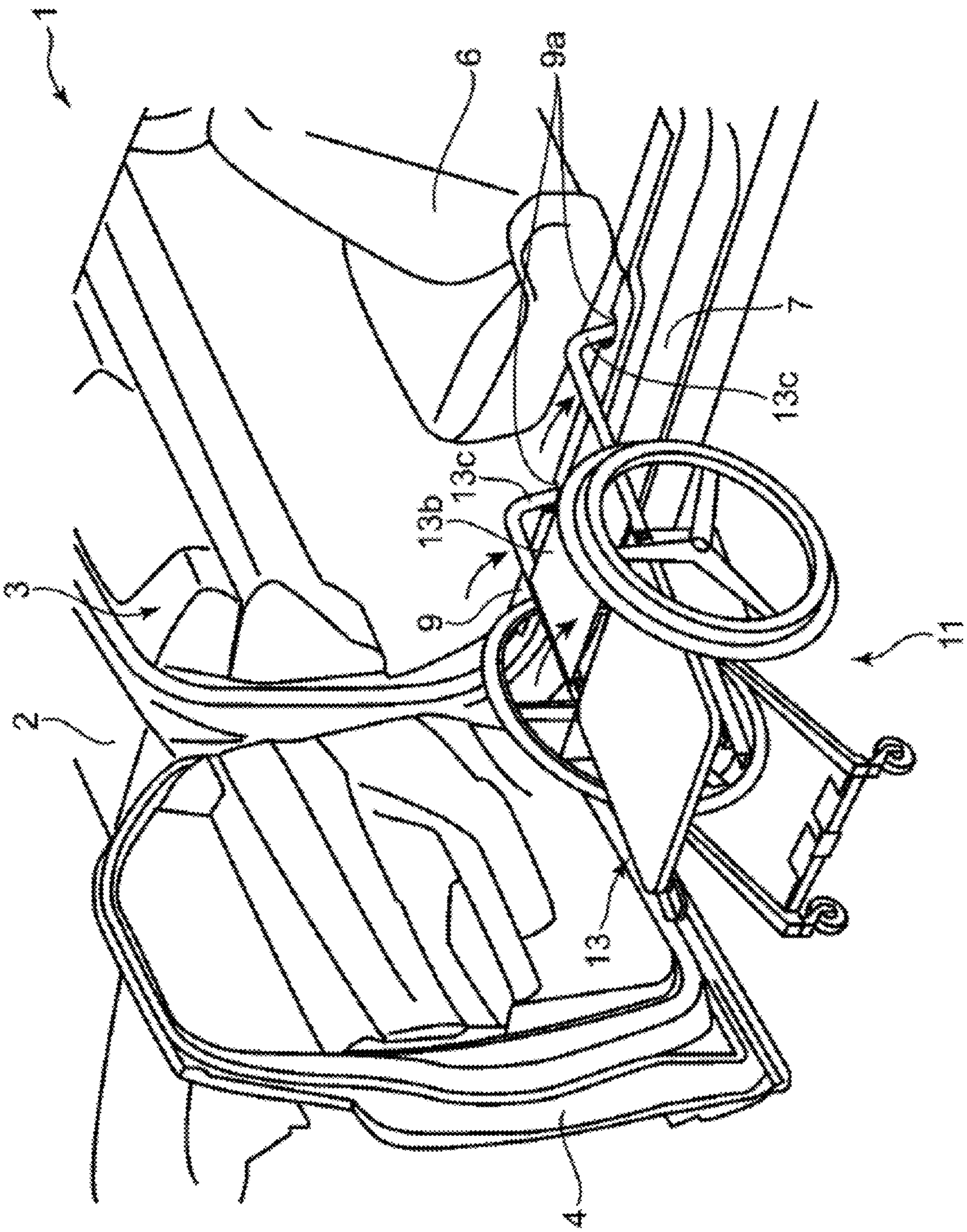
FIG. 1 is a perspective explanatory diagram illustrating the state in which a wheelchair according to an exemplary embodiment is fixed to a side sill at the lower edge of the door opening on the side surface of a vehicle.

As illustrated in FIG. 1, a wheelchair 11 according to an exemplary embodiment can be fixed to a side sill 7, which is the vehicle body member of a vehicle 1 and forms a door opening 3 on the side surface of the vehicle 1 when a seat back portion **13*b* of a wheelchair seat 13 is tilted backward of the wheelchair 11. The side sill 7 is a substantially tubular strength member extending in a front-rear direction X of the vehicle 1**.

Specifically, the vehicle 1 in the FIG. 1 includes a vehicle body 2 having the door opening 3, a front door 4 that covers the door opening 3, and a vehicle seat 6 provided inside the vehicle body 2.

The vehicle 1 includes vehicle body members that form at least parts of the door opening 3 of the vehicle 1. Specifically, the vehicle 1 in the FIG. 1 has, as the vehicle body members that form the door opening 3, the side sill 7 that extends in the front-rear direction X of the vehicle 1 and forms the lower edge of the door opening 3, and pillars and an upper rail that are the other vehicle body members and extend upward from the front end and the rear end of the side sill 7.

Figure 6:
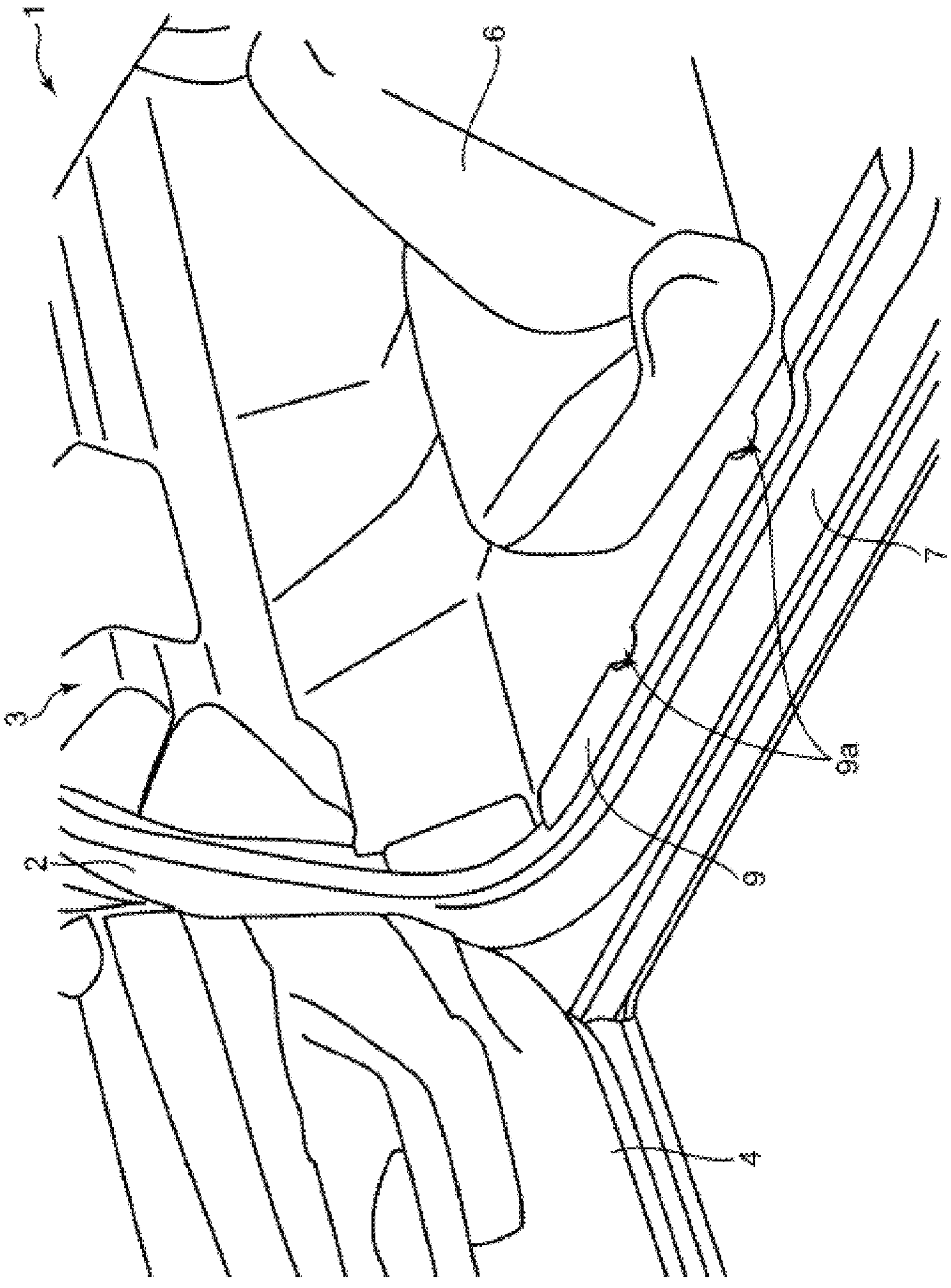
FIG. 6 is a perspective view illustrating engaged holes with which push-along handle portions of the wheelchair are engaged in an interior trim that covers the upper surface inside the vehicle of the side sill in FIG. 1.
Figure 7:
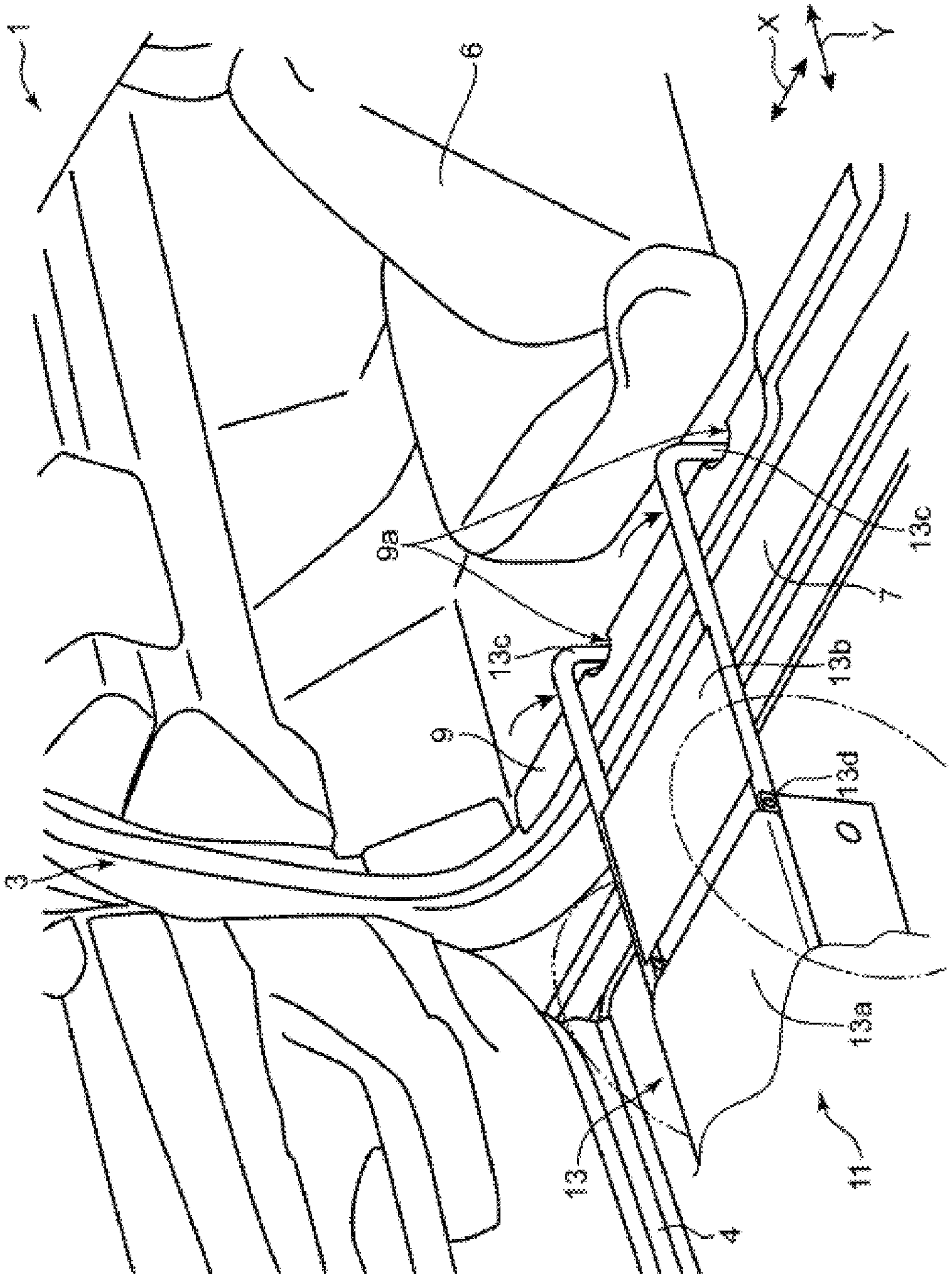
FIG. 7 is a perspective explanatory diagram illustrating the state in which the push-along handle portions of the wheelchair with the seat back portion tilted backward of the wheelchair are engaged with the engaged holes of the interior trim in FIG. 6.

In addition, as illustrated in FIG. 1 and FIGS. 6 and 7, in the vehicle 1 according to an exemplary embodiment, the upper surface of a part of the side sill 7 inside the vehicle is covered with an interior trim 9, which is an interior member. The interior trim 9 is fixed to the upper surface of the side sill 7 by adhesive or the like.

As illustrated in FIG. 1 and FIGS. 6 and 7, the interior trim 9 is provided with a pair of engaged holes **9*a* as engaged portions that can be engaged with a pair of push-along handle portions 13*c* that can also be used as engaging portions provided in the wheelchair 11. The distance between the pair of engaged holes 9*a* is set so that the pair of push-along handle portions 13*c* of the wheelchair 11 described above can be engaged with the pair of engaged holes 9*a***.

Figure 2:
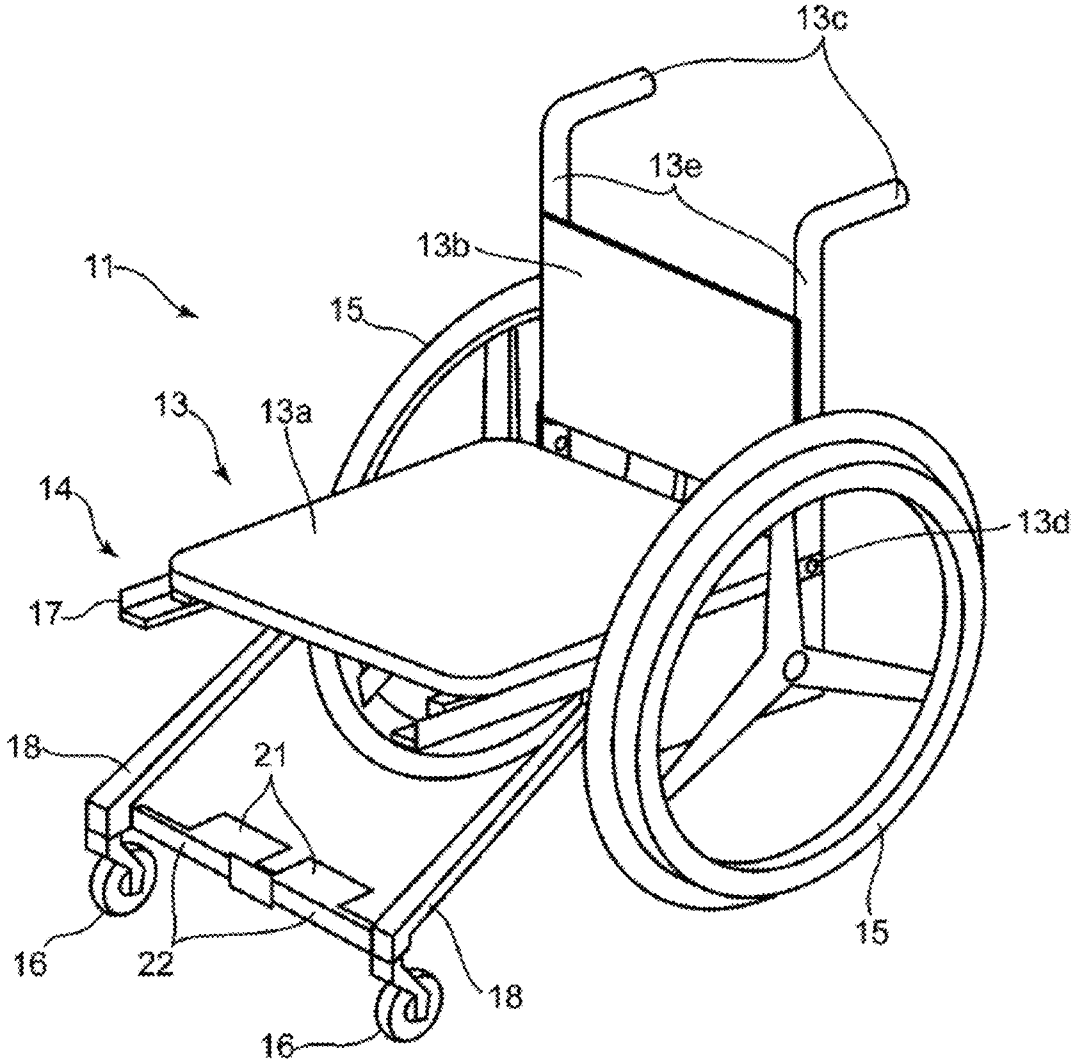
FIG. 2 is a perspective view illustrating the wheelchair in FIG. 1.
Figure 3:
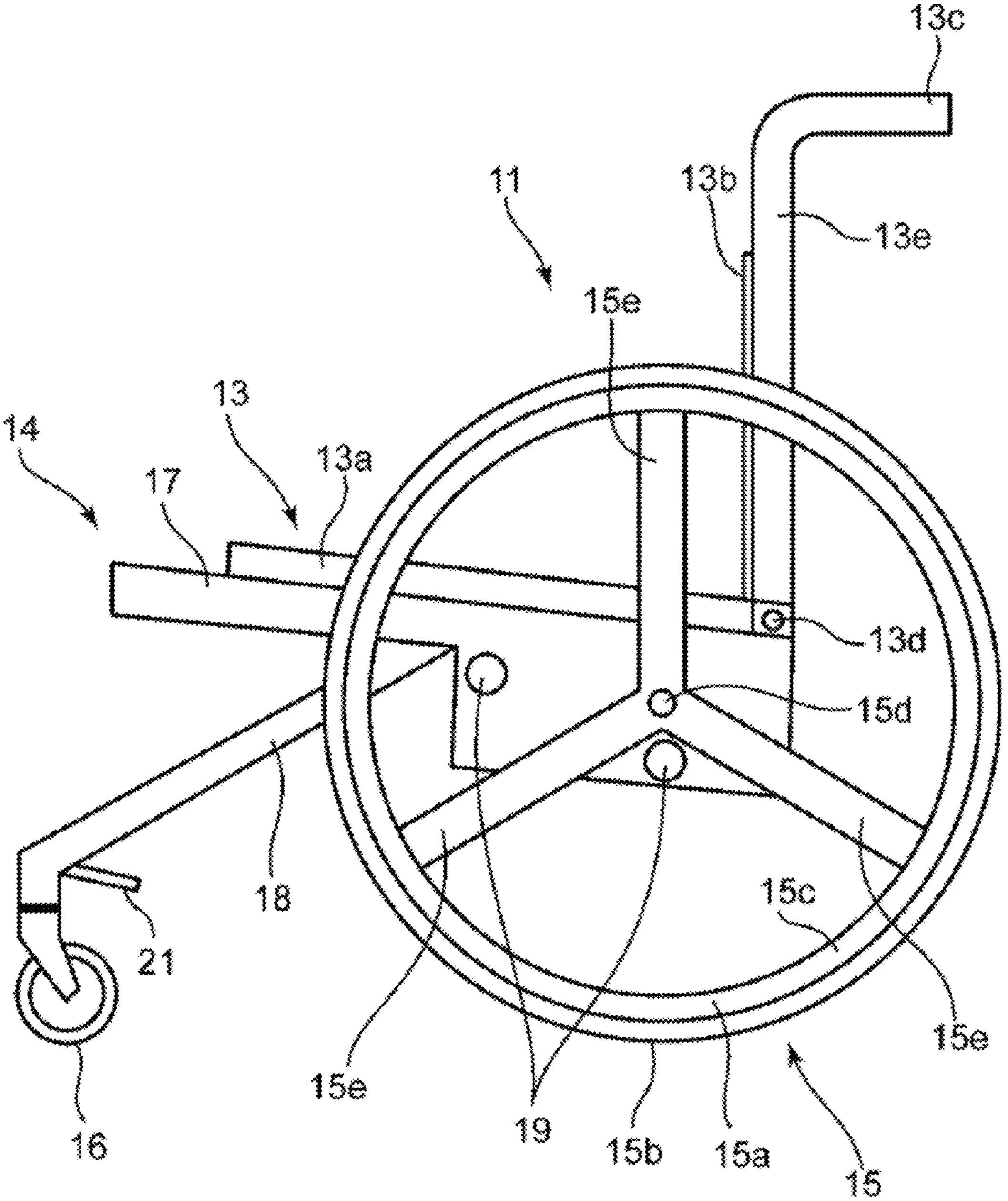
FIG. 3 is a side view illustrating the wheelchair in FIG. 1.

As illustrated in FIGS. 2 and 3, the wheelchair 11 includes the wheelchair seat 13 (the seat according to the present disclosure), a body frame 14, and a plurality of wheels, that is, a pair of rear wheels 15 and a pair of front wheels 16.

The wheelchair seat 13 includes a seating portion **13*a* on which the wheelchair user can sit, the seat back portion 13*b* with which the back of the user makes contact, a pair of support bars 13*e* that support both sides of the seat back portion 13*b*, and the pair of push-along handle portions 13*c* that can be gripped, from behind the wheelchair 11, by an assistant or the like who pushes the wheelchair 11 (generic term for a person who pushes the wheelchair 11 from behind, such as an assistant or a caregiver). In an exemplary embodiment, the push-along handle portions 13*c* constitute the engaging portions by which the wheelchair 11 can be fixed to the vehicle 1**.

Figure 4:
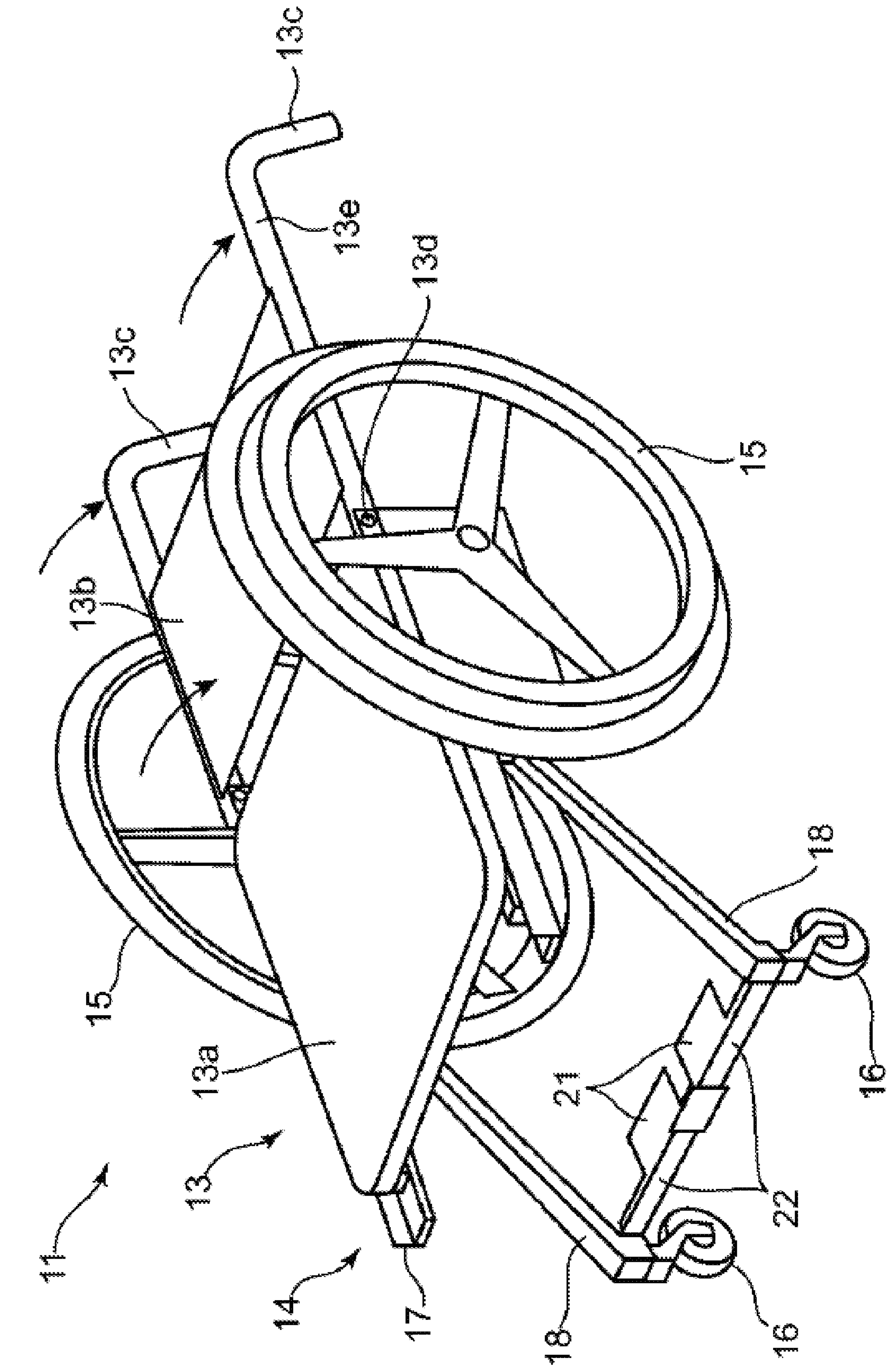
FIG. 4 is a perspective explanatory diagram illustrating the state in which the seat back portion of the seat in FIG. 2 is tilted backward of the wheelchair.
Figure 5:
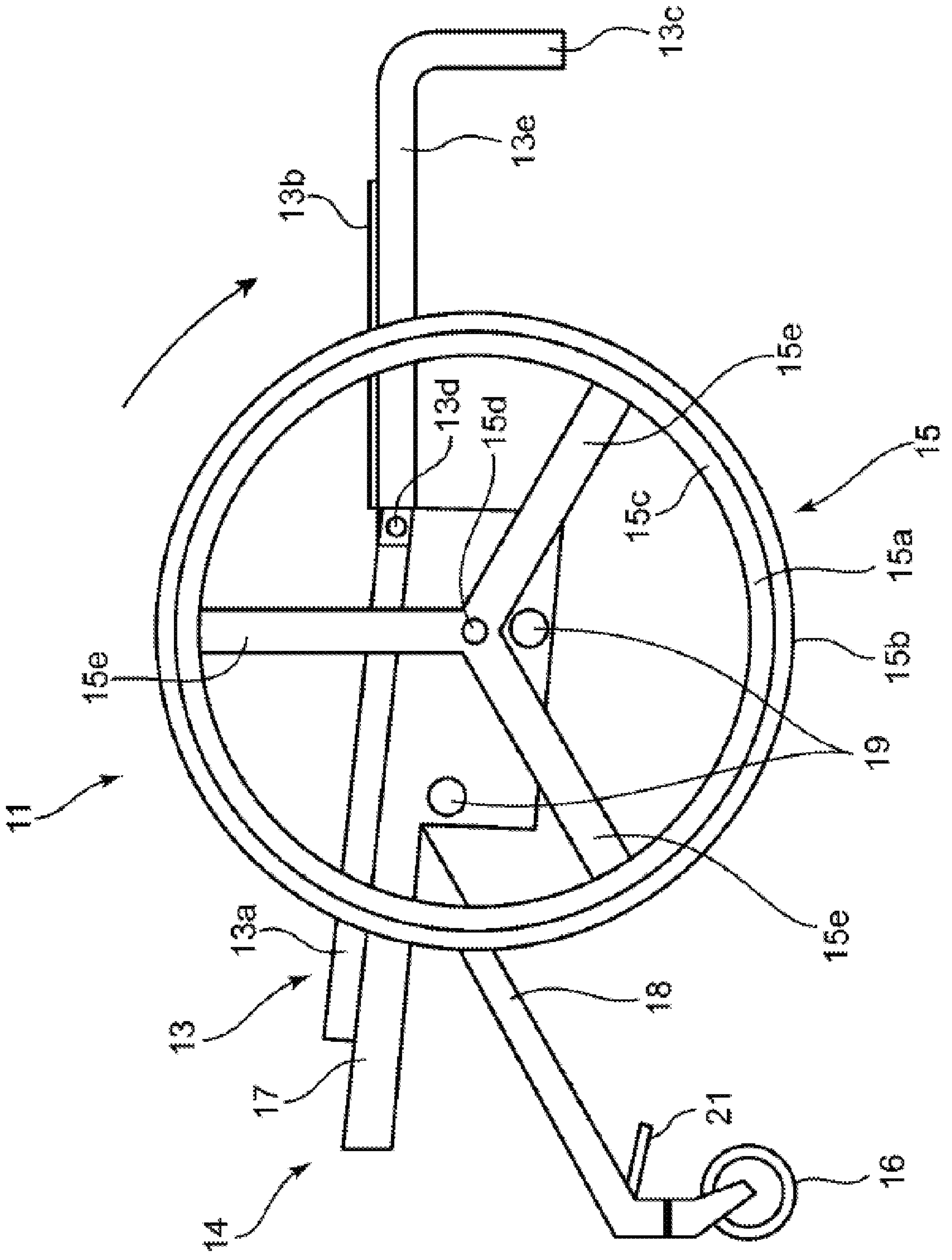
FIG. 5 is a side explanatory diagram illustrating the state in which the seat back portion of the seat in FIG. 3 is tilted backward of the wheelchair.

As illustrated in FIGS. 4 and 5, the inclination angle of the seat back portion **13*b* with respect to the seating portion 13*a* can be changed. Specifically, the seat back portion 13*b* is attached rotatably between the standing position (see FIGS. 2 and 3) at which the seat back portion 13*b* stands orthogonally to the seating portion 13*a* and the reclining position (FIGS. 4 and 5) at which the seat back portion 13*b* is tilted backward of the seating portion 13*a*. More specifically, the seat back portion 13*b* is attached swingably in the vertical direction about the rotation support portion 13*d* as the rotation center at the rear end of the seating portion 13*a***.

Although the wheelchair seat 13 is detachably attached above the body frame 14, the wheelchair seat 13 may be fixed to the body frame 14.

Furthermore, as illustrated in FIGS. 2 and 3, the body frame 14 has a structure capable of supporting the wheelchair seat 13 and specifically includes a pair of main frames 17 disposed on the left and right sides of the wheelchair 11 separately, a pair of sub-frames 18 attached to the pair of main frames, a crossbar 19 connecting the pair of main frames 17 to each other, a pair of footrests 21, and a pair of footrest arms 22.

The pair of rear wheels 15 is rotatably attached to the pair of main frames 17, respectively.

The main frames 17 according to an exemplary embodiment are L-shaped members as illustrated in FIGS. 2 and 3 and can support the seating portion **13*a* of the wheelchair seat 13 from below and both sides in the width direction of the wheelchair 11. The pair of main frames 17 and the seating portion 13*a*** are detachably connected to each other by a known connection method, such as fitting a convex portion provided in one of them to a concave portion provided in the other of them.

The pair of sub-frames 18 is provided so as to extend downward of the main frames 17 and forward of the rear wheels 15 from the main frames 17. The pair of front wheels 16 is rotatably attached to the front end portions of the pair of sub-frames 18.

Each of the rear wheels 15 illustrated in FIG. 2 includes a spoke wheel **15*a* made of metal or hard resin (such as FRP) and a tire 15*b* made of rubber or soft resin. The spoke wheel 15*a* includes a rim 15*c* that is annular in side view, a hub 15*d* rotatably supported by the main frame 17, and a plurality of (three in FIGS. 2 and 3) spokes 15*e* that extend radially from the hub 15***d* and are connected to the inner peripheral surface of the rim 15*c*. In contrast, each of the front wheels 16 includes a caster and the like, can swing around a shaft extending in the vertical direction with respect to the end portion of the sub-frame 18, and can change the turning direction.

The pair of footrests 21 are the portions on which the feet of the wheelchair user are placed. The pair of footrests 21 is attached to positions above the front wheels 16 of the pair of sub-frames 18 via the pair of footrest arms 22.

The pair of push-along handle portions 13*c* has the structure in which the seat back portion 13*b* can be fixed to the side sill 7 by engaging the push-along handle portions 13*c* with the side sill 7, which is the vehicle body member that forms the door opening 3 of the vehicle 1, when the seat back portion 13*b* is tilted backward of the wheelchair 11. Specifically, the push-along handle portions 13*c* project backward of the seat back portion 13*b* from the upper ends of the pair of support bars 13*e* supporting both sides of the seat back portion 13*b*.

In the wheelchair 11 according to the exemplary embodiment configured as described above, the wheelchair 11 can be easily fixed to the vehicle 1 by simply tilting the seat back portion 13*b* backward of the wheelchair 11 as illustrated in FIGS. 6 and 7. Specifically, the wheelchair 11 is disposed at a position at which the back surface of the seat back portion 13*b* faces the door opening 3 of the vehicle 1, and the seat back portion 13*b* is tilted backward of the wheelchair 11. At this time, the pair of push-along handle portions 13*c* can be fixed to the side sill 7 via the interior trim 9 by engaging the pair of push-along handle portions 13*c* with the pair of engaged holes 9*a* formed in the interior trim 9 that covers the vehicle side upper surface of the side sill 7 on the side surface of the vehicle 1. This can fix the wheelchair 11 to the vehicle 1. In this state, the wheelchair user can move to the vehicle seat 6 by hand or the like through the seat back portion 13*b*.

The push-along handle portions 13*c* may be engaged with the edge portion on the vehicle inner side of the interior trim 9 or the side sill 7 without being engaged with the pair of engaged holes 9*a*.

(Characteristics of the Exemplary Embodiment)

(1)

The wheelchair 11 according to an exemplary embodiment includes the seating portion 13*a* on which the user of the wheelchair 11 sits, the body frame 14 that supports the seating portion 13*a*, and the wheels (the pair of rear wheels 15 and the pair of front wheels 16) rotatably supported on the left and right sides of the body frame 14, and the seat back portion 13*b* capable of changing the inclination angle with respect to the seating portion 13*a*, in which the push-along handle portions 13*c* are provided as the engaging portions for fixing the seat back portion 13*b* to the vehicle body member. When the seat back portion 13*b* is tilted backward of the wheelchair 11 as illustrated in FIGS. 4 and 5, the push-along handle portions 13*c* enable the seat back portion 13*b* to be fixed to the side sill 7 via the interior trim 9 as the vehicle body member that forms the door opening 3 of the vehicle 1 as illustrated in FIG. 7.

According to this structure, when the seat back portion 13*b* is tilted backward of the wheelchair 11, the push-along handle portions 13*c* as the engaging portions are engaged with the side sill 7, which is the vehicle body member forming the door opening 3 of the vehicle 1, and the seat back portion 13*b* can be fixed to the side sill 7. Accordingly, since the wheelchair 11 and the vehicle 1 are directly connected to each other without intervention of another member, the wheelchair can be stably fixed to the vehicle 1 when the wheelchair user gets on and off the vehicle 1. In this state, the wheelchair user can easily move from the seat back portion 13*b* to the seat 6 of the vehicle 1 by hand or the like.

In addition, since the wheelchair 11 according to an exemplary embodiment has the push-along handle portions 13*c* as the engaging portions, the getting-on-and-off assist mechanism including the transfer board does not need to be provided in the vehicle 1 unlike the prior art described in patent document 1, there is an advantage that the space in the vehicle is not reduced.

(2)

In the wheelchair 11 according to an exemplary embodiment, the engaging portions are configured by the push-along handle portions 13*c*, provided behind the seat back portion 13*b*, that can be gripped by the assistant pushing the wheelchair 11.

According to this structure, the engaging portions are configured by the pair of push-along handle portions 13*c* provided behind the seat back portion 13*b*. Accordingly, the seat back portion 13*b* can be easily fixed to the side sill 7 by simply connecting the push-along handle portions 13*c* to the engaged holes 9*a* of the interior trim 9 fixed to the side sill 7 as the vehicle body member that forms the door opening 3 of the vehicle 1 when the seat back portion 13*b* is tilted backward of the wheelchair 11. Moreover, since the push-along handle portions 13*c* not only have the original function of the push-along handle portions 13*c* through which the assistant or the like pushes the wheelchair 11 by hand, but also serve as the engaging portions for fixing the wheelchair 11 to the vehicle 1, an increase in the number of components of the wheelchair can be reduced.

In addition, the pair of push-along handle portions 13*c* is used as the engaging portions in an exemplary embodiment. Accordingly, the seat back portion 13*b* of the wheelchair 11 can be more stably fixed to the side sill 7 by the pair of push-along handle portions 13*c* disposed apart from each other.

(3)

In the wheelchair 11 according to an exemplary embodiment, the push-along handle portions 13*c* project backward of the seat back portion 13*b* and can be engaged with the engaged portions (the engaged holes 9*a* of the interior trim 9 fixed to the side sill 7 in an exemplary embodiment) formed in the vehicle body member when the seat back portion 13*b* is tilted backward of the wheelchair 11. According to this structure, since the push-along handle portions 13*c* are engaged with the engaged holes 9*a* of the interior trim 9 as the engaged portions formed in the vehicle body member when the seat back portion 13*b* is tilted backward of the wheelchair 11, the wheelchair 11 can be stably fixed to the vehicle 1. Accordingly, the wheelchair user can easily transfer from the wheelchair 11 to the vehicle seat 6. Moreover, after transferring to the vehicle seat 6, the state in which the wheelchair 11 is fixed to the vehicle 1 can be easily released by removing the push-along handle portions 13*c* from the engaged holes 9*a*.

(4)

In the wheelchair 11 according to an exemplary embodiment, the push-along handle portions 13*c*, which are the engaging portions, can be engaged with the side sill 7, which forms the lower edge of the door opening 3 formed on the side surface of the vehicle 1.

According to this structure, by engaging the push-along handle portions 13*c* with the side sill 7, which is the strength member forming the lower edge of the door opening 3 on the side surface of the vehicle 1, to fix the seat back portion 13*b* to the side sill 7, the wheelchair 11 can be securely fixed to the vehicle body 2 at a position as close as possible to the vehicle seat 6 of the vehicle 1. As a result, the wheelchair user can easily transfer from the wheelchair 11 to the vehicle seat 6 of the vehicle 1.

(Modifications)

(A)

Figure 8:
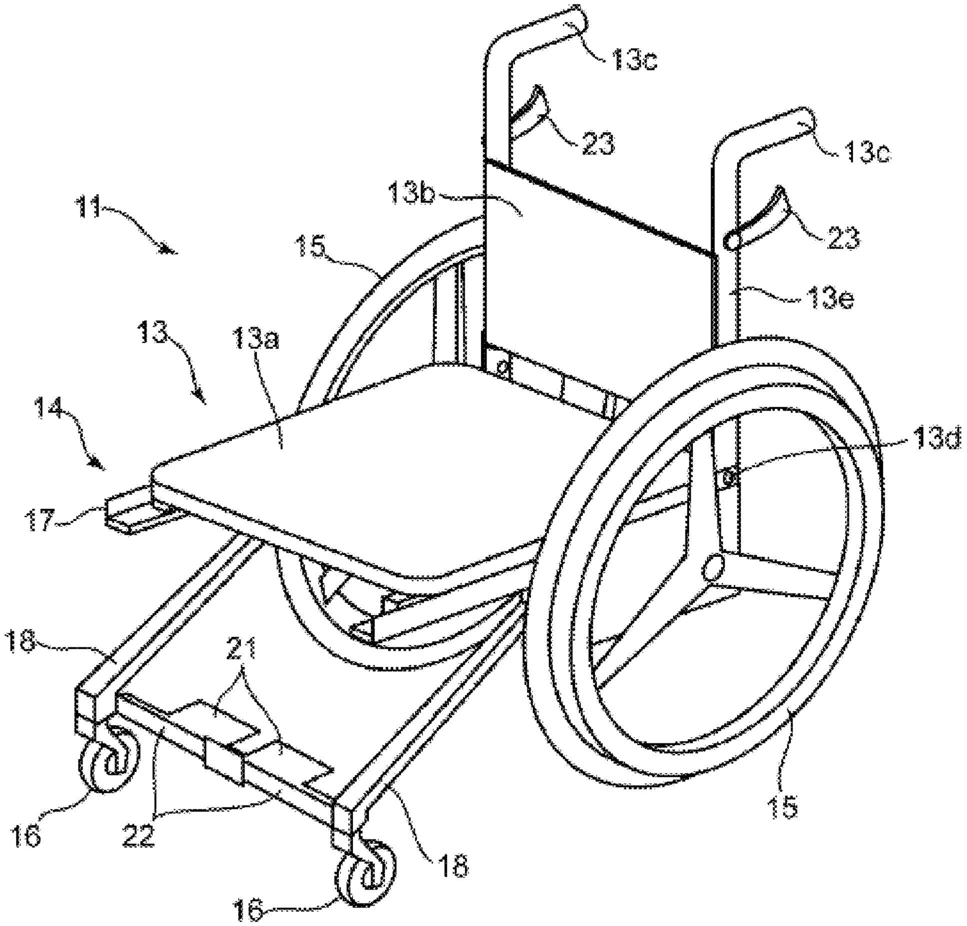
FIG. 8 is a perspective view illustrating the wheelchair according to an exemplary embodiment in which holding portions are provided at a position separated downward from the push-along handle portions.
Figure 9:
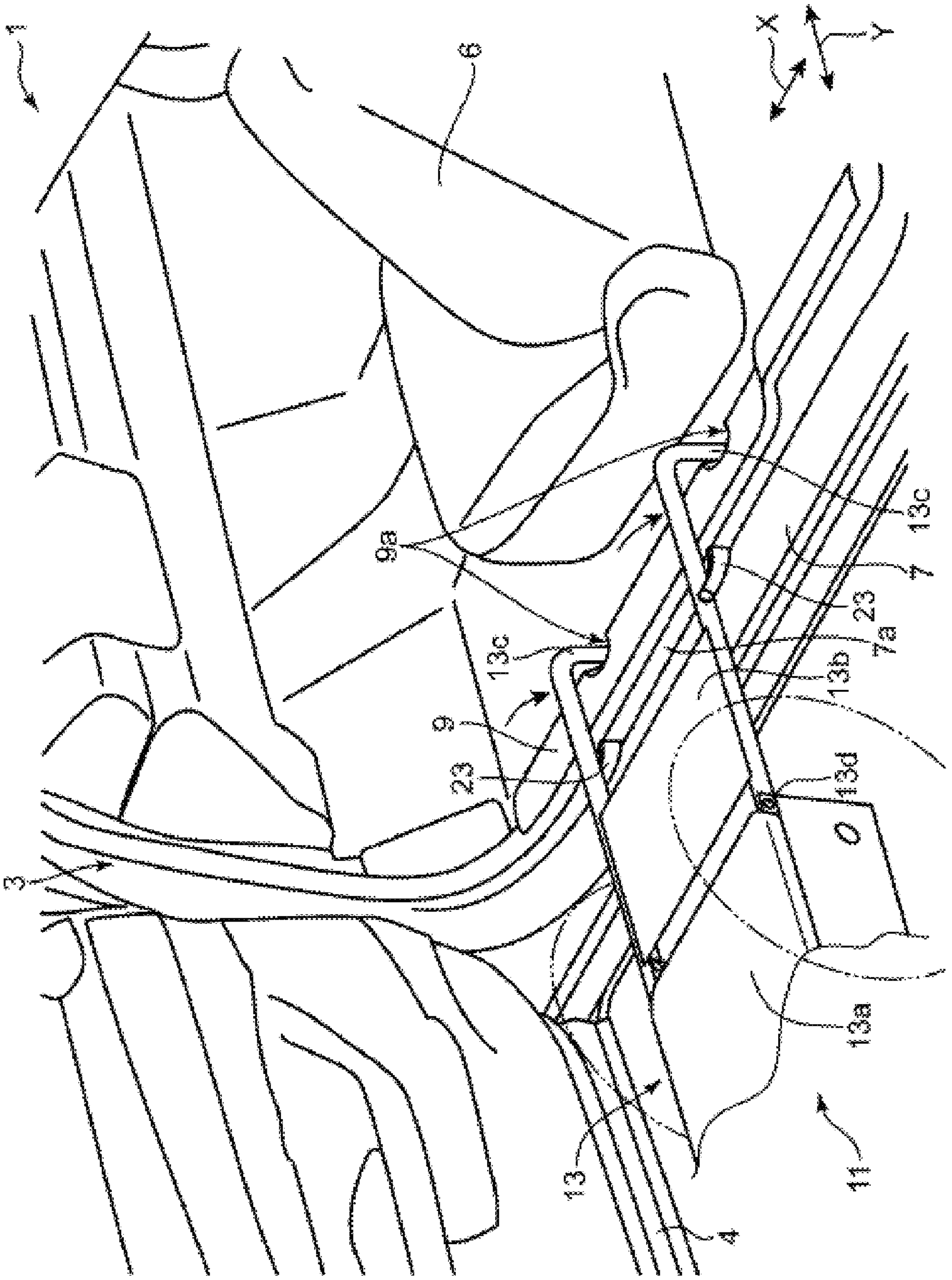
FIG. 9 is a perspective explanatory diagram illustrating the state in which the wheelchair in FIG. 8 is deformed with the seat back portion tilted backward of the wheelchair and the push-along handle portions and holding portions hold the side sill and the interior trim.

Although the engaging portions engaged with the vehicle body member are configured by the push-along handle portions 13*c* that project backward of the seat back portion 13*b* in an exemplary embodiment described above, the engaging portions may further include holding portions 23 as illustrated in FIGS. 8 and 9 in a modification of the present disclosure. The holding portions 23 are disposed apart from the push-along handle portions 13*c* and can hold the vehicle body member such as the side sill 7 together with the push-along handle portions 13*c*. For example, the holding portions 23 include elastically deformable hooks having hooked tips. The holding portions 23 can be elastically deformed in the vertical direction (the direction in which the distance from the push-along handle portions 13*c* changes). The other structure of the wheelchair 11 is the same as the structure of the wheelchair 11 according to the exemplary embodiment illustrated in FIGS. 1 to 5.

In the wheelchair according to the modification illustrated in FIGS. 8 and 9, the push-along handle portions 13*c* can be engaged with the pair of engaged holes 9*a* (that is, the pair of engaged holes 9*a* of the interior trim 9 fixed to the upper surface of the side sill 7) that are the engaged portion of the vehicle member that forms the door opening 3 of the vehicle 1 when the seat back portion 13*b* is tilted backward of the wheelchair 11, and the side sill 7 (particularly, an upper flange portion 7*a* of the side sill 7), which is the vehicle body member, can be held by the push-along handle portions 13*c* and the holding portions 23. This can securely fix the wheelchair 11 to the side sill 7, which is the vehicle body member.

(B)

Although the push-along handle portions 13*c* are engaged with the pair of engaged holes 9*a* of the interior trim 9 fixed to the upper surface of the side sill 7 in the exemplary embodiment described above, the present disclosure is not limited to this example. In a modification of the present disclosure, the push-along handle portions 13*c* may be engaged with concave portions or convex portions (such as flange portions) formed on the side sill 7 and, in this case, the push-along handle portions 13*c* can be fixed directly to the side sill 7 without intervention of the interior trim 9, thereby achieving a simpler structure of the vehicle 1 and a stronger fixation between the wheelchair 11 and vehicle 1.

(C)

Although the engaging portions are configured by the push-along handle portions 13*c* in the exemplary embodiment described above, the present disclosure is not limited to this example. The engaging portions of the present disclosure are the engaging portions provided in the seat back portion 13*b* and only need to have the structure in which the seat back portion 13*b* can be fixed to the vehicle body member such as the side sill 7 that forms the door opening 3 of the vehicle 1 when the seat back portion 13*b* is tilted backward of the wheelchair 11. Accordingly, a dedicated member may be provided as the engaging portion separately from the push-along handle portions 13*c*.

(D)

In the present disclosure, the door opening of the vehicle 1 is not limited to the door opening 3 on the side surface of the vehicle 1 and may be a rear gate that opens in the rear portion of the vehicle 1. Even in this case, the wheelchair 11 can be fixed to the periphery of the rear gate that opens in the rear portion of the vehicle 1 by the push-along handle portions 13*c*, which are the engaging portions.

(E)

Although the push-along handle portions 13*c* are used as an example of the engaging portions in the present disclosure, the present disclosure is not limited to this example. As another example of the engaging portion, one of a latch mechanism used for a locking mechanism for a vehicle door and an engaged portion such as a striker engaged with the latch mechanism may be attached to the rear side of the seat back portion 13*b* of the wheelchair 11. In this case, the other of the latch mechanism and the engaged portion only needs to be attached to the vehicle body member.

(F)

Although the wheelchair 11 is fixed to the side sill 7 at the lower edge of the door opening 3 in the exemplary embodiment described above, the present disclosure is not limited to this example and the wheelchair 11 may be fixed to another vehicle body member (such as, for example, the front door 4) around the door opening 3.

ADVANTAGE OF THE DISCLOSURE

In the wheelchairs according to the aspects described above, the wheelchairs can be stably fixed to the vehicle when the wheelchair user gets on and off the vehicle.

DESCRIPTION OF REFERENCE SIGNS AND NUMERALS

1: vehicle
2: vehicle body
3: door opening
6: vehicle seat
7: side sill (vehicle body member)
9: interior trim
9*a*: engaged hole (engaged portion)
11: wheelchair
13: wheelchair seat (seat)
13*a*: seating portion
13*b*: seat back portion
13*c*: push-along handle portion (engaging portion)
14: body frame
15: rear wheel
16: front wheel
23: holding portion

What is claimed is:

1. A wheelchair comprising:
a seat on which a wheelchair user sits;
a body frame that supports the seat;
a wheel rotatably supported by the body frame;
a seat back to change an inclination angle with respect to the seat; and
an engager to fix the seat back to a vehicle body structure that forms a door opening of a vehicle by being engaged with the vehicle body structure when the seat back is tilted backwards from the wheelchair.

2. The wheelchair according to claim 1,
wherein the engager includes a push-along handle that is provided behind the seat back and is grippable by a user pushing the wheelchair.

3. The wheelchair according to claim 2,
wherein the push-along handle projects backwards from the seat back and is engageable with an engager formed in the vehicle body structure when the seat back is tilted backwards from the wheelchair.

4. The wheelchair according to claim 3, wherein the engager of the wheelchair has a holder located apart from the push-along handle, the holder to hold the vehicle body structure together with the push-along handle.

5. The wheelchair according to claim 2, wherein the vehicle body structure is a side sill that extends in a front to rear direction of the vehicle, and the side sill forms a lower edge of the door opening.

6. The wheelchair according to claim 5, wherein the side sill is covered with interior trim, and the interior trim includes a pair of holes that can be engaged with by the push along-handle and another push-along handle of the wheelchair.

7. The wheelchair according to claim 6, wherein the engager includes another push-along handle that is provided behind the seat back and is grippable by the user so that the push-along handle and the other push-along handle are a pair of push-along handles.

8. The wheelchair according to claim 2, wherein the engager includes another push-along handle that is provided behind the seat back and is grippable by the user so that the push-along handle and the other push-along handle are a pair of push-along handles.

9. The wheelchair according to claim 1, wherein the vehicle body structure is a side sill that extends in a front to rear direction of the vehicle, and the side sill forms a lower edge of the door opening.

10. A wheelchair comprising:

a seat on which a wheelchair user sits;

a body frame that supports the seat;

a wheel rotatably supported by the body frame;

a seat back to change an inclination angle with respect to the seat; and means for engaging to fix the seat back to a vehicle body structure that forms a door opening of a vehicle by being engaged with the vehicle body structure when the seat back is tilted backwards from the wheelchair.

11. The wheelchair according to claim 10, wherein the means for engaging includes a push-along handle that is provided behind the seat back and is grippable by a user pushing the wheelchair.

12. The wheelchair according to claim 11, wherein the push-along handle projects backwards from the seat back and is engageable with means for engaging formed in the vehicle body structure when the seat back is tilted backwards from the wheelchair.

13. The wheelchair according to claim 12, wherein the means for engaging of the wheelchair has a holder located apart from the push-along handle, the holder to hold the vehicle body structure together with the push-along handle.

14. The wheelchair according to claim 11, wherein the vehicle body structure is a side sill that extends in a front to rear direction of the vehicle, and the side sill forms a lower edge of the door opening.

15. The wheelchair according to claim 14, wherein the side sill is covered with interior trim, and the interior trim includes a pair of holes that can be engaged with by the push along-handle and another push-along handle of the wheelchair.

16. The wheelchair according to claim 15, wherein the means for engaging includes another push-along handle that is provided behind the seat back and is grippable by the user so that the push-along handle and the other push-along handle are a pair of push-along handles.

17. The wheelchair according to claim 11, wherein the means for engaging includes another push-along handle that is provided behind the seat back and is grippable by the user so that the push-along handle and the other push-along handle are a pair of push-along handles.

18. The wheelchair according to claim 10, wherein the vehicle body structure is a side sill that extends in a front to rear direction of the vehicle, and the side sill forms a lower edge of the door opening.

* * * * *